Jan. 27, 1970     L. BAKKER     3,491,707
GASEOUS WASTE INCINERATOR
Filed Feb. 12, 1968

INVENTOR.
Lubertus Bakker
BY
Wayne H. Lang
AGENT

United States Patent Office 3,491,707
Patented Jan. 27, 1970

3,491,707
GASEOUS WASTE INCINERATOR
Lubertus Bakker, Cleveland, Ohio, assignor to The Air Preheater Company, Inc., Wellsville, N.Y., a corporation of Delaware
Filed Feb. 12, 1968, Ser. No. 704,829
Int. Cl. F23g 3/06
U.S. Cl. 110—8                                    10 Claims

ABSTRACT OF THE DISCLOSURE

A high temperature after-burner that effects the combustion of gaseous vapors generated at a source before the vapors are permitted to be exhausted to the atmosphere.

BACKGROUND OF THE INVENTION

Field of the invention

The present invention relates to a highly efficient fume incinerator arrangement whereby fumes or vapors containing organic materials, volatile or otherwise, being exhausted through a stack to the atmosphere from any of various sources may be completely incinerated before the non-combustible exhaust gases that remain are vented to the atmosphere.

Description of prior art

Although incineration of exhaust gases that contain obnoxious combustible products is known to be an obvious way of eliminating the affects thereof, the efficiency of such operation has not been too critical and many gases exhausted to the atmosphere contain a substantial portion of their original contaminants or irritating breakdown products. Thus the U.S. patents, No. 1,064,477 and No. 1,886,760, were partially effective attempts to reduce the objectionable combustable gases that remained unburned in the exhaust gases being given off during the in complete combustion of fuel, but the actual results were less than complete success.

Somewhat later the U.S. patents, No. 2,965,051 and No. 2,936,724 were developed as various improvements hopefully obtaining a more complete combustion of the obnoxious effluent gases, while U.S. Patent No. 3,248,178 was developed as an improved arrangement whereby an even more complete combustion of the exhaust gases and elimination of their harmful constituents was attained. However, in certain instances and under various conditions that require complete combustion of the waste gases resulting from a high final temperature and a closely controlled period of final incineration, the known devices are deficient and they are accordingly not widely accepted or widely used.

SUMMARY OF THE INVENTION

Air pollution can be caused by various operations or it can come from various sources such as the objectionable fumes which are exhausted from places of business such as dry cleaning establishments, paint shops, and generally such places which have organic fumes to be exhausted. Another category of air pollution is comprised of vapors such as smoke and the like which are emitted from smokestacks as a result of incomplete combustion.

Frequently the smoke clouds being emitted from a smokestack are the result of the incomplete or poor combustion of trash in incinerators. The trash may range from the cellulose based material as paper or wet material such as garbage to the highly carbonaceous material such as rubber tires or resins and it is accordingly a major object of this invention to define a device which has multiple applications for the complete elimination of combustible organic materials from air-borne gases.

The device may also be used in the generation of products such as charcoal as a salable product by which process wood is carbonized by slow and controlled dry distillation which leads to the emission of lighter organic fumes and tars which are burned in the after-burner. Similarly the device may be used for the drying and beneficiation of organic low grade fuels such as peat where the moisture and lighter organic products thereof may be driven off and burned.

Finally the device may find great application in the petroleum and petrochemical industries as a more effective way of eliminating waste gases now only partially eliminated by open flares.

BRIEF DESCRIPTION OF THE DRAWING

The nature of my invention and the unique advantage thereof will be clear to those skilled in the art from the following detailed description of the invention and the accompanying drawings in which.

Figure 1:
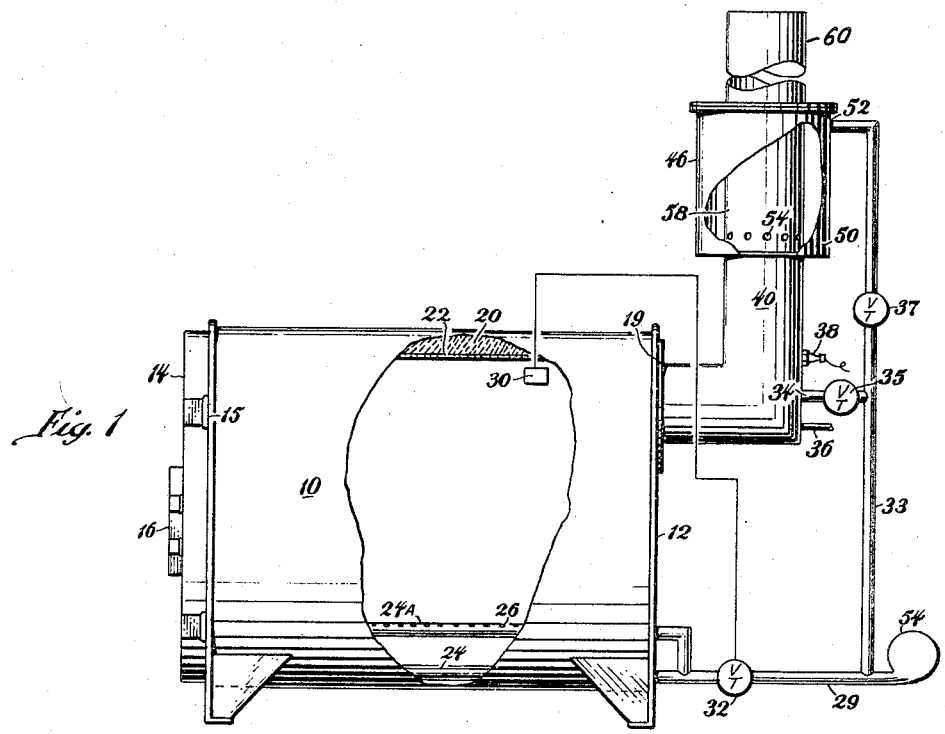
FIGURE 1 is a side elevation, partially broken away, of my incinerator and after-burner as defined herein.

In the drawings of the present invention the reference numerical 10 designates a combustion vessel having a generally ellipsoidal configuration with a fixed head 12 at one end and an access door 14 pivotally supported on hinges 15 at the other. A further access door 16 of more limited size is provided on the door 14 to provide limited access to the chamber within housing 10 when it is in use. At the top of the vessel near the fixed head thereof is an outlet port 19 for the gaseous products of combustion. The inner wall of the vessel 10 is insulated by a layer of firebrick 20 which in turn has a coating of castable fire resistant material 22 capable of withstanding temperatures ranging upwards to 2500° F.

The bottom of the vessel 10 is adapted to receive a series of tubes 26 having slits or holes 24 of adequate size to supply air to the combustion vessel 10 for combustion of a charge therein. Accordingly, the device of this invention provides for from 80% to 120% of the theoretical amount of air needed for complete burning. Thus as the carbon content increases with the type of material being burned, the amount of air required will accordingly increase too, but it will always be maintained by thermo-couple 30 at from 80% to 120% of the stoichiometric amount required for combustion.

Figure 2:
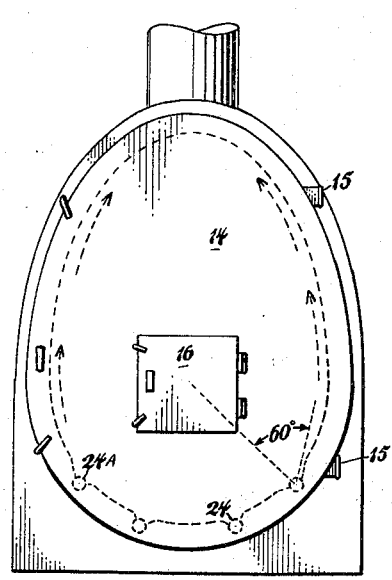
FIGURE 2 is a front view of the device of FIG. 1.

The holes 26 in tubes 24 which provide the oxygen for combustion within the furnace are positioned to achieve optimum air circulation within the furnace. Thus the outer tubes 24–A are positioned with the holes 26 thereof set at an angle of substantially 60° with the radius in the manner shown by FIG. 2 to move air along the periphery of the chamber whereby there is optimum cooling of the walls and sufficient air circulation to remove the volatile products quickly and thus produce some decomposition of the charge in the furnace without flame.

Another reason for the positioning of the air supply holes 26 at a preferred angle with radius is that such an arrangement provides efficient burning of the charge in the chamber without stirring it and increasing the turbulence that would move fly-ash produced thereby up the stack. Holes 26 of more centrally located tubes 24 exhaust nearly in a line parallel to the radius of the incinerator chamber.

The same tubes 24 may be used as supply ducts for the selective injection of an inert gas whereby oxidation within the incinerator may be stopped at any moment by the injection of a gas incapable of supporting combustion. In this manner it is possible that the loss of as much as one-third the charge within the furnace can be prevented by the timely curtailment of oxidation, as for example, may be desired in the production of charcoal. Inasmuch as one or even both ends of the furnace may be made to open completely, there is little reason for crushing the charcoal produced therein into a dust-like consistency of substantially decreased value.

A thermocouple arrangement 30 at the top of the incinerator housing 10 controls a valve 32 which regulates the supply of air for oxidation to the incinerator by the air tubes 24. Thus incineration of a charge within the chamber can be limited by controlling the flow of air supplied to the burners or even terminating the flow of air thereto and supplying instead a charge of inert gas.

Figure 3:
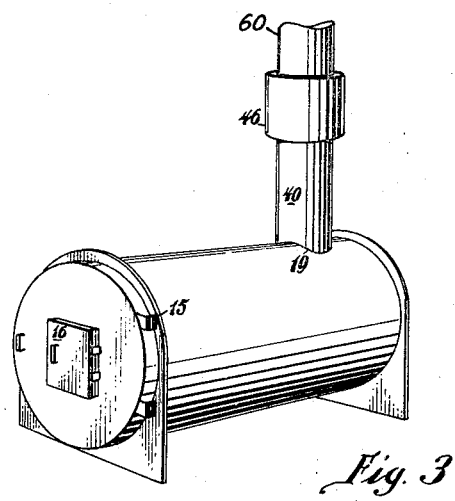
FIGURE 3 is a front view of the after-burner arrangement as applied to a generally round incinerator.

The ellipsoidal shape of the furnace is due primarily to the desire to create a larger reflective heat zone (by radiation from the walls) than is possible with a furnace having the normal cylindrical configuration shown in FIG. 3. Furthermore, the ellipsoidal configuration of the furnace presents a vessel having at optimum shape for withdrawing the gaseous products of combustion with the least amount of resistance while still providing sufficient turbulence to effect optimum mixing of gases and substantially constant conditions of combustion.

At or near the top of the furnace and preferably at the end thereof remote from the access door 14 is the exhaust opening 19 to which is secured the stack 60.

The stack 60 may be of any approved construction capable of withstanding temperatures up to 2500° F. Conventionally the stack is of uniformly sized cylindrical design and is lined with firebrick or other insulating material. Stack 60 is supplied with air via conduit 34 and valve 35 for the burning of fuel supplied via an injector or burner 36 and the unburned gases exhausting from the primary incinerator 10. Ignition of this mixture is effected by means such as a spark plug 38 to produce a first after-burner combustion chamber 40 within the stack. A glow plug, pilot flame or other such means may be used interchangeably and within the scope of this invention to ignite the mixture within the first combustion chamber.

A wrapper or jacket 46 located beyond the first after-burner chamber 40 and in spaced relation to the stack 60 encloses an annular heat exchange chamber 50 which receives heat from hot gas exhausting axially through the stack 60. The heat exchange chamber 50 has an air inlet 52, having a control valve 37, formed in the upper end of wrapper 46 and exhaust ports 54 formed in the wall of stack 60 at the opposite end of the heat exchange chamber 50 to direct air to be heated counter-flow to the flow of hot gas within the stack. This arrangement permits air heated while traversing the chamber 50 to exhaust as highly heated air to a combustion chamber 58 of a second after-burner located within the stack 60 concentrically within the annular chamber 50.

In this invention air for combustion in the furnace 10, the first after-burner 40 or the second after-burner 58 may be provided by a single source 54 but controlled individually by the valve means 32, 35, and 37. In this manner air from a single source may be directed to any and all points of use and may be controlled manually or automatically in response to variable conditions. Thus, for example, the valve 32 in supply line 29 which directs combustion air to the incinerator housing 10 may be controlled by the thermocouple 30 at the top of the chamber 10. Similarly the air for combustion supplied via line 33 to the first after-burner 40 or the second after-burner 58 may be controlled by respective valving means 35 and 37 to supply the air thereto at a ratio ranging from 1:1 to 2:1. Furthermore, it is within the scope of this invention to provide automatic means (not shown) for controlling valves 35 and 37 in accordance with a ratio as may be determined by combustion within the stack 60 whereby sufficient air is supplied at all times for complete combustion of the combustible gas within the stack.

In operation the material to be burned is placed in the incineration chamber in housing 10 and ignited in the usual manner. After burning has commenced, the waste products of combustion rise through the incinerator and exhaust through the outlet stack 60. Combustion within the incinerator chamber 10 is controlled closely by regulating the air for combustion which enters through control valve 32 and is supplied by a source 54 whereby there is only partial combustion therein while the remaining combustible material is driven off as a gas.

As the hot products of combustion move into the stack 60 fuel is fed through a supply line to injector 36 and mixed with air supplied through a duct 34 and supply valve 35 to provide a mixture which is readily ignited by the means 38 in the first after-burner chamber 40.

Hot combustion products of the burning mixture in chamber 40 exhaust into the second after-burner chamber 58 within the wrapper 46. As the combustible hot products of combustion pass through chamber 58 of stack 60 surrounded by the spaced wrapper 46, air for their combustion is directed through inlet 52 to chamber 50 in counter-flow heat exchange relation with the hot exhaust gas of chamber 58 and is accordingly heated. Air so heated is then fed through ports 54 to the second after-burner chamber 58 where the heated air is mixed with the hot combustible products of combustion emerging from the after-burner combustion chamber 40, said resulting mixture being subject to self-ignition and further burning within said inner stack to thereby consume the products of combustion remaining in the exhaust gas until only harmless residual gases with no organic contaminants remain to be exhausted to the atmosphere.

It should be understood that other after-burners of the type defined may be located at additional points along the exhaust stack 60 to provide complete combustion of the gases being exhausted therethrough. Furthermore the relative size of the different parts thereof may be varied or other modifications may be made without departing from the spirit of the invention. It is therefore intended that all matter contained in the above description or shown in the accompanying drawings shall be interpreted as illustrative and not in a limiting sense.

I claim:

1. Apparatus for burning combustible gas products comprising a source of combustible gas, an exhaust stack connected at one end to said source and venting an open end to the atmosphere, an air supply duct connected into said exhaust stack, means effecting the combustion of gas and air within said stack to provide a first combustion chamber region therein, a second combustion chamber region in said stack downstream from said first combustion chamber region and upstream from the open end of said stack, a wrapper surrounding said exhaust stack in spaced relation thereto to define an annular heat exchange chamber surrounding said second combustion chamber region, an air supply port in said wrapper near the end of said annular chamber which is located closest to said open end of said stack, an air outlet port in said exhaust stack leading to the opposite end of said annular chamber to provide an outlet for heated air that traverses the annular chamber and exhausts through the outlet port to the second combustion chamber region whereby unburned gas exhausting from the first combustion chamber region is mixed with air preheated by the combustion of gas within said second combustion chamber region to effect self-ignition of the gas and air mixture before it is exhausted to the atmosphere.

2. Apparatus for burning combustible gas products comprising a housing enclosing a source of combustible gas, a continuous exhaust stack connected at one end to said housing and venting an open end to the atmosphere, an air supply duct connected into exhaust stack, fuel supply means for the admission of fuel to said stack, a first combustion chamber region in said stack, means for igniting the gas and air together with fuel supplied by said fuel admission means in the first combustion chamber region to form a first after-burner, a second combustion chamber region in said continuous stack downstream from said first combustion chamber region and upstream from the open end of said exhaust stack, a wrapper surrounding a portion of said continuous exhaust stack in spaced relationship thereto to define an annular heat exchange chamber surrounding said portion of said stack, air supply means in the downstream end of said wrapper, radially disposed air outlet means in the exhaust stack and communicating with the opposite end of said annular chamber to form a second after-burner whereby unburned gas exhausting from the first combustion chamber region is mixed with air preheated in said annular chamber to effect self-ignition of said gas in said second combustion chamber region before it is exhausted to the atmosphere.

3. Apparatus for burning combustible gas products as recited in claim 1 including means in the air supply ducts to the first and second combustion chambers which control the air flow thereto.

4. Apparatus for burning combustible gas products as recited in claim 1 wherein the exhaust stack housing the first and second after-burners comprises a single duct.

5. Apparatus for burning combustible gas products as recited in claim 1 including means forcing the air through said annular chamber counter the flow of gas exhausting through the stack.

6. Apparatus for burning combustible gas products as recited in claim 1 wherein the second combustion chamber comprises a continuation of said first combustion chamber having substantially the same cross-sectional area.

7. Apparatus for burning combustible gas products as recited in claim 1 wherein the housing enclosing the source of combustible gas has a generally elongate cross-sectional configuration to provide optimum circulation of the gases produced therein.

8. Apparatus for burning combustible gas products as recited in claim 6 wherein the housing enclosing the elongate chamber is of ellipsoidal configuration.

9. Apparatus for burning combustible gas products as defined in claim 1 including supply means for oxygen extending longitudinally along the bottom of said housing.

10. Apparatus for burning combustible gas products as defined in claim 9 wherein the supply means for oxygen at the bottom of said housing comprises pipe means having exhaust openings laterally positioned to direct air therefrom along the periphery of said housing.

References Cited

UNITED STATES PATENTS

| 2,965,051 | 12/1960 | Kocee | 110—8 XR |
| 3,176,634 | 4/1965 | Martin | 110—8 XR |
| 3,190,244 | 6/1965 | Hoskinson | 110—8 |
| 3,248,178 | 4/1966 | Hoskinson | 110—8 XR |

KENNETH W. SPRAGUE, Primary Examiner